POWER FEED MECHANISM

Original Filed March 7, 1951 5 Sheets-Sheet 1

INVENTORS
WILLIAM A. ESCHENBURG
DAVID D. PETTIGREW
CLARENCE JOHNSON
BY Strauch, Nolan & Diggins
ATTORNEYS

POWER FEED MECHANISM

Original Filed March 7, 1951 5 Sheets-Sheet 2

INVENTORS
WILLIAM A. ESCHENBURG
DAVID D. PETTIGREW
CLARENCE JOHNSON
BY Strauch, Nolan & Diggins
ATTORNEYS May 4, 1954 W. A. ESCHENBURG ET AL Re. 23,822

POWER FEED MECHANISM

Original Filed March 7, 1951 5 Sheets-Sheet 3

INVENTORS
WILLIAM A. ESCHENBURG
DAVID D. PETTIGREW
CLARENCE JOHNSON
BY Strauch, Nolan & Diggins
ATTORNEYS

POWER FEED MECHANISM

Original Filed March 7, 1951 5 Sheets-Sheet 4

INVENTORS
WILLIAM A. ESCHENBURG
DAVID D. PETTIGREW
CLARENCE JOHNSON
BY Strauch, Nolan & Diggins
ATTORNEYS May 4, 1954 W. A. ESCHENBURG ET AL Re. 23,822

POWER FEED MECHANISM

Original Filed March 7, 1951 5 Sheets-Sheet 5

INVENTORS
WILLIAM A. ESCHENBURG
DAVID D. PETTIGREW
CLARENCE JOHNSON
BY Strauch, Nolan & Diggins
ATTORNEYS Reissued May 4, 1954 Re. 23,822

UNITED STATES PATENT OFFICE 23,822

POWER FEED MECHANISM

William A. Eschenburg, Plainfield, N. J., David D. Pettigrew, Milwaukee, Wis., and Clarence Johnson, South Euclid, Ohio, assignors to Rockwell Manufacturing Company, Pittsburgh, Pa., a corporation of Pennsylvania Original No. 2,655,058, dated October 13, 1953, Serial No. 214,284, March 7, 1951. Application for reissue January 4, 1954, Serial No. 402,197

28 Claims. (Cl. 77—33.5)

Matter enclosed in heavy brackets [ ] appears in the original patent but forms no part of this reissue specification; matter printed in italics indicates the additions made by reissue.

This invention relates to power feed mechanisms and more particularly to an improved construction adapted primarily for use as a drill feed mechanism.

The present invention is primarily concerned with improvements in hydro-pneumatic feed mechanisms of the type disclosed in application of Clarence Johnson Serial No. 133,922 filed December 19, 1949, for "Hydro-Pneumatic Power Mechanism" for effecting rapid movement of a drill or other machine tool into and out of operative working engagement with a workpiece and relatively slow feed movement during working engagement of the tool.

In apparatus of this kind, the positioning of the machine tool with respect to the workpiece is effected by a power piston and two or more control pistons, the rate of movement of the power and control pistons being determined by one or more control valves suitably arranged in an hydro-pneumatic circuit.

It is an important object of the present invention to provide a novel construction of the elements and related circuits of such a hydro-pneumatic mechanism to materially decrease the size and weight of the apparatus while increasing its operating efficiency and its adaptability for production by quantity production methods.

It is a further object to provide a novel control valve for such a feed mechanism.

It is another object to provide a novel quill and spindle construction for an hydro-pneumatic drill feed mechanism.

It is a further object to provide an improved feed rate adjusting means for a power feed mechanism.

It is another object to provide an improved power feed mechanism having a minimum number of compactly arranged structurally rugged parts adapted for production under quantity production methods.

It is a further object to provide a novel construction for a power feed mechanism which facilitates manufacture, assembly and repair, thereby decreasing the costs of fabrication and maintenance of the mechanism.

It is a further object to provide a novel positioning and support structure for a power feed mechanism.

It is an additional object to provide a novel construction for a hydro-pneumatic power feed mechanism which facilitates bleeding and filling the mechanism with operating fluids.

It is also an object to provide an improved drill feed mechanism which incorporates a novel means for compensating for internal volume changes occasioned by relative movements of the components of the apparatus.

Further objects will become apparent as the description proceeds in connection with the accompanying drawings in which:

Figure 6 is an elevation of the end carp for the control section of the mechanism of Figure 1;

Figure 13 is an enlarged fragmentary plan view of one of the valve elements of Figures 3 and 11;

Figure 14:
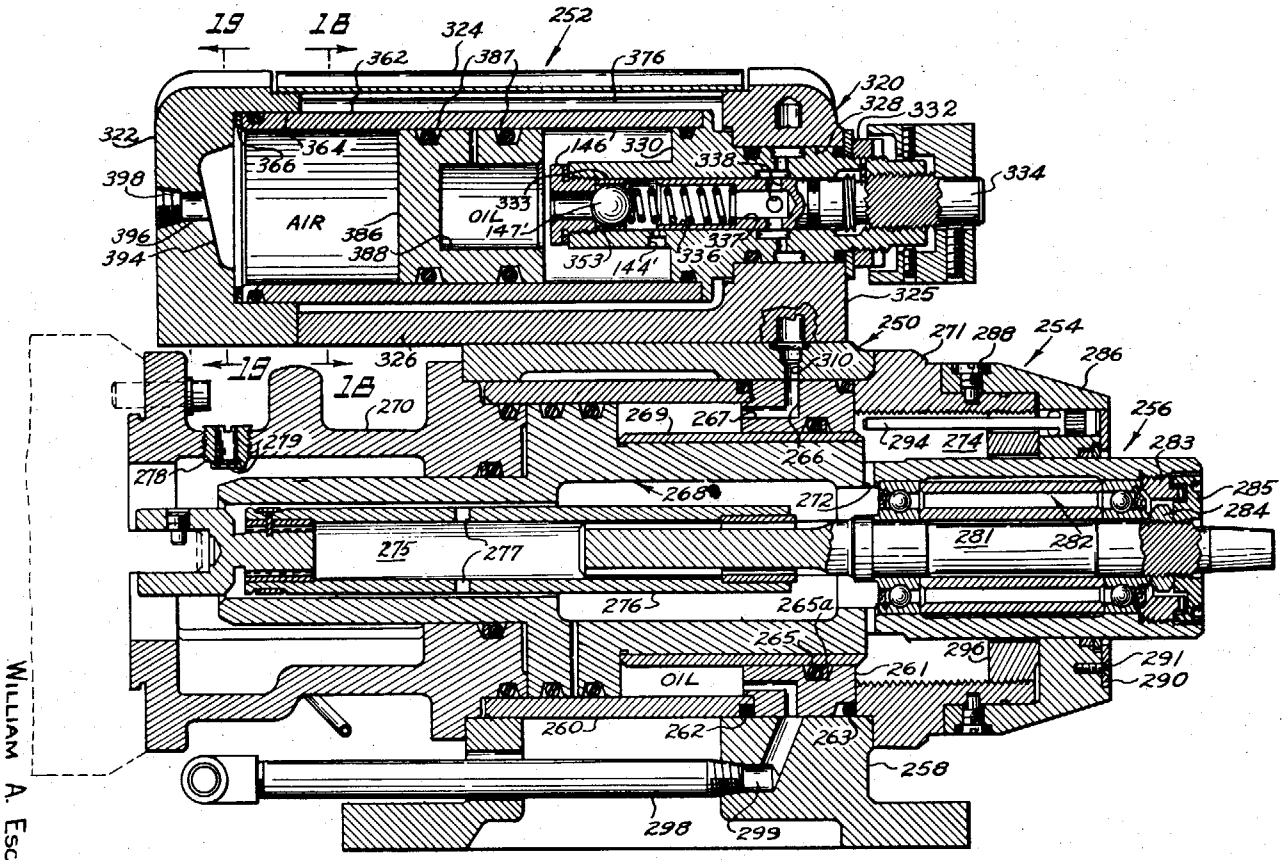
Figure 14 is a sectional view similar to Figure 3 of a modified form of the invention.
Figure 18:
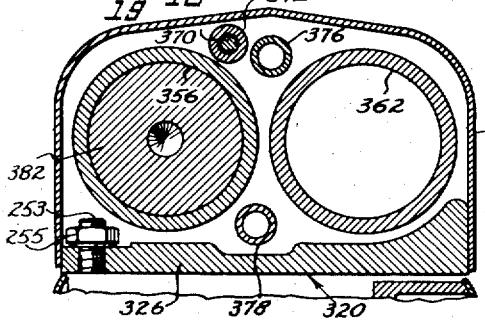
Figure 17:
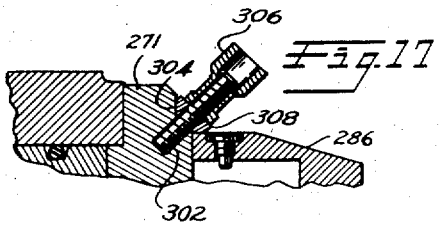
Figure 19:
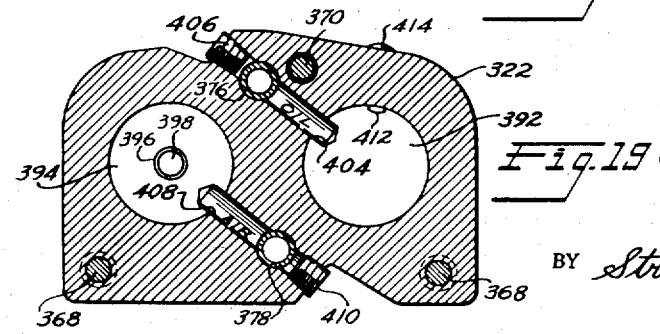

Figure 17 is a fragmentary sectional view of a locking mechanism for the stroke adjusting means in the mechanism of Figure 14; and Figures 18 and 19 are sectional views of the control section of the mechanism of Figure 14 taken along lines 18—18 and 19—19, respectively of Figure 14.

Figure 1:
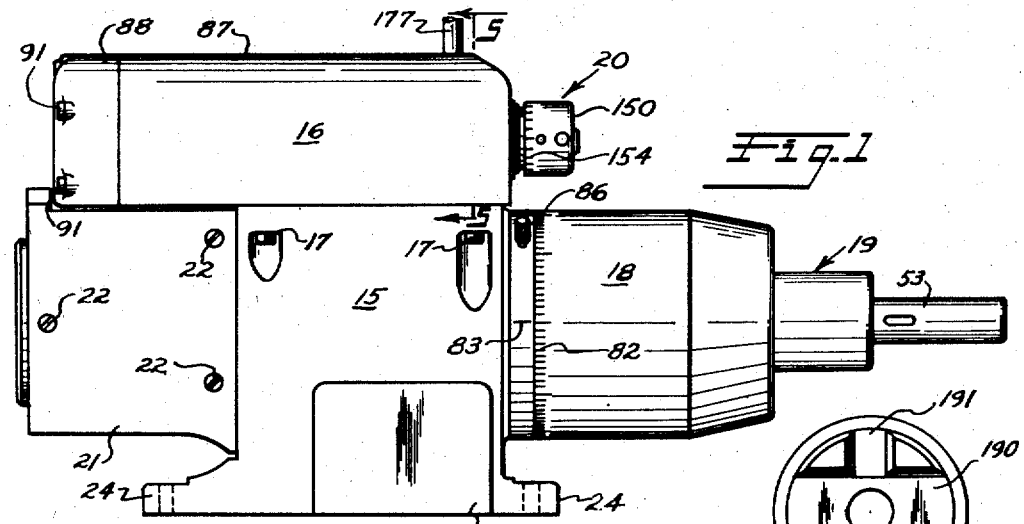
Figure 1 is a side elevation of one form of an improved power feed mechanism made in accordance with the present invention.
Figure 12:
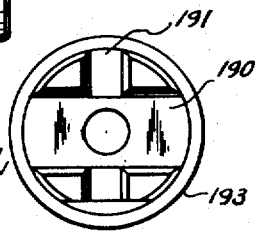
Figure 12 is a right end elevation of the valve boly of Figure 11.
Figure 2:
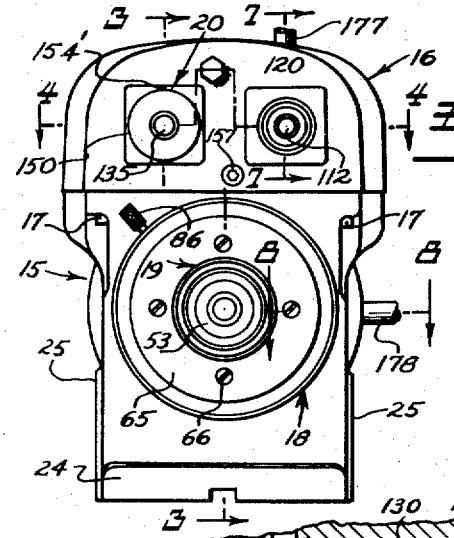
Figure 2 is an end elevation of the mechanism of Figure 1.
Figure 15:
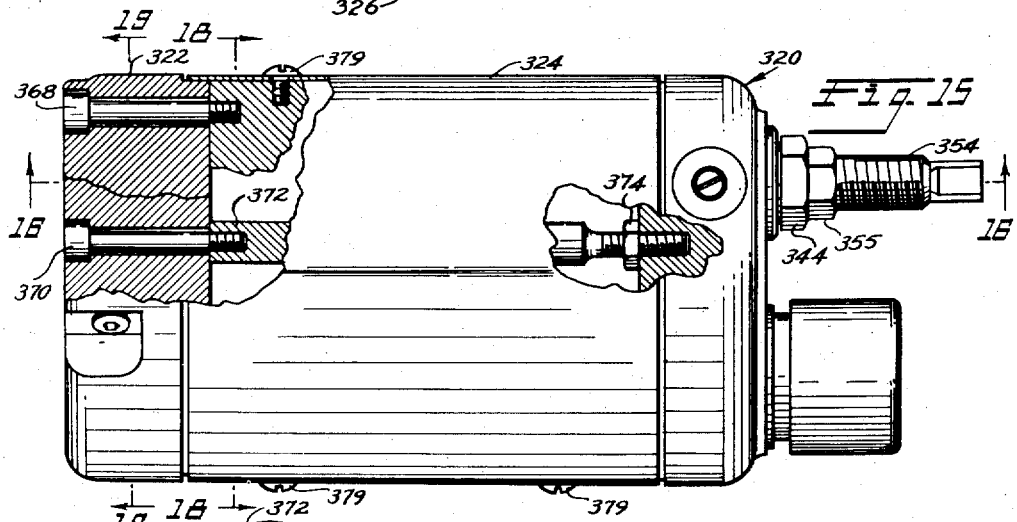
Figure 15 is a top plan view of the mechanism of Figure 14 partially broken away to illustrate internal constructional details.

Referring to Figures 1 and 2, 15 indicates the power section of the improved feed mechanism to which a control section indicated generally at 16 is rigidly attached as by bolts 17. A stroke adjusting unit indicates generally at 18, through which one end of a combined power piston and drill quill-spindle unit 19 passes, is mounted on the front end surface of power section 15, and a speed control unit, indicated generally at 20, is mounted on the front end surface of control section 16, as more fully described hereafter. A pair of cover plates 21 are attached to the rear of the power section 15 as by screws 22 to protect the driving mechanism from dust, water, and other abrasive and corrosive foreign matter.

Figures 3, 5, 7:
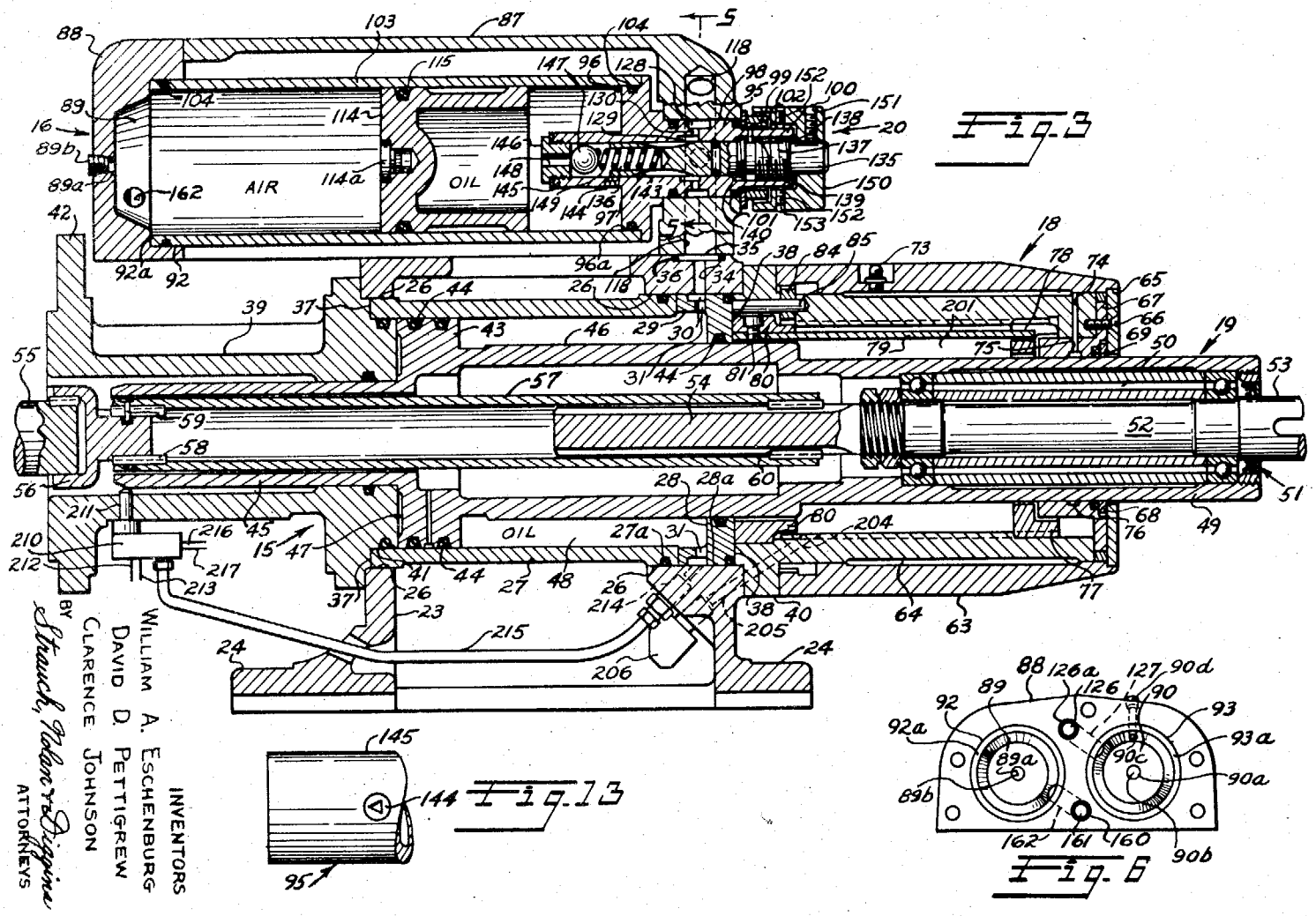
Figure 3 is an enlarged sectional view taken along line 3—3 of Figure 2 illustrating the power section and a portion of the control section of the improved mechanism.
Figure 5 is an enlarged sectional view taken along line 5—5 of Figure 1, line 5—5 being shown also in Figure 3 for illustrative clarity.

Referring now to Figure 3, and particularly to power section 15, 23 indicates a main body housing cast from relatively inexpensive metal and having mounting flanges 24 disposed at opposite ends along its lower surfaces. As shown in Figures 1 and 2, smooth, flat, vertically extending mounting pads 25 are formed on the opposite sides of housing 23 to provide mounting surfaces by which the drill mechanism may be mounted in a variety of common machine tool supports. The pads 25 are accurately machined so that the drill unit will be held in positive longitudinal and lateral alignment with the support on which it is mounted.

The cast housing 23 is of hollow cylindrical construction provided at its opposite sides with inwardly directed annular flanges the inner annular walls of which are accurately machined to provide aligned circular bores 26 at its opposite ends. These bores are adapted to receive carefully machined high grade steel sleeves or inserts 27 and 28, preferably with a close machine fit. To assure proper alignment of bores 26 and uniformity of size, these bores are preferably formed in a single straight-through boring operation obviating the necessity of the time consuming and expensive back boring operation and finishing machining operations that would be necessary if the housing were initially a solid casting. O-ring seals 27a and 28a are provided on sleeves 27 and 28 respectively to maintain the respective inserts in fluid tight engagement with bore 26.

The outer surface of an annular peripheral flange portion 29 of sleeve 28 is provided with an annular groove 30 which is in communication with the inner surface of the sleeve through a plurality of circumferentially spaced ports 31. A passage *or fixed orifice* 34, having an enlarged portion 35 in which a sealing ring 36 is held, passes through the upper surface of housing 23 in register with groove 30. Sleeves 27 and 28 are maintained in abutting relation in bore 26 by shoulders 37 and 38 of annular housing extension members 39 and 40 respectively which are rigidly attached to opposite ends of housing 23 as by bolts (not shown) to form cylinder heads for the power cylinder which comprises sleeve or inserts 27 and 28.

Housing extension 39, at the end containing shoulder 37, is provided with an axially extending shoulder 41 of reduced diameter defining an annular space to closely receive the adjacent end of sleeves 27 and at its other end is provided with an annular motor mounting flange 42. The bore of extension 39 at the shouldered end is slightly reduced in diameter and carefully internally machined for a purpose to be presently pointed out.

Housing 23 and its extension members 39 and 40 are designed to receive the main power piston of the power feed mechanism and the connector members adapting the power piston for connection to whatever device or element it is to operate. In the preferred form of this invention, housing 23 and members 39 and 40 receive the novel combined power piston and drill quill-spindle unit 19 which is provided with an enlarged piston portion 43, having suitable sealing rings 44, reciprocably received within sleeve 27, in fluid tight relation thereto. Reduced portions 45 and 46 of quill 19 respectively reciprocably engage the reduced bore of end member 39 and the inner sleeve 28. The bore of end member 39 and the sleeve 28 are provided with suitable sealing means to define sealed chambers 47 and 48 on opposite sides of piston portion 43, the shoulder 41 of extension member 39 also being provided with a sealing ring 44a to complete the seal for chamber 47.

Rotatably supported by means of a preloaded bearing cartridge indicated generally at 50, within a further reduced section 49 of quill 19, is a drill spindle 52 having a tool chuck 53 at one end and an elongated splined section 54 at its other end. The bearing cartridge 50 is preferably preloaded to prevent random axial movement of the spindle 52 with respect to the quill 19 and is preferably of the general construction disclosed in United States Letters Patent No. 2,452,089. A suitable sealing structure indicated generally at 51 is provided at the forward end of quill 19 to prevent the entrance of coolant, lubricant, and other abrasive or corrosive foreign matter which may be present on the surface of chuck 53 into the interior of quill 19 and bearing cartridge 50.

A drive shaft 55 connected to any suitable power source, not shown, is provided with a keyed adapter 56 carrying an elongated driving sleeve 57 adapted to transmit power through adapter 56, to spindle 52. While sleeve 57 may be connected to adapter 56 and spindle 52 in any suitable manner, the present invention contemplates the provision of fibre inserts press fitted in the ends of sleeve 57 and respectively provided with internal splines 58 and a securing pin 59 at the end connected to adapter 56 and splines 60 alone at the end connected to spindle 52. This construction automatically compensates for any slight misalignment between adapter 56 and spindle 52 yet assures a relative free sliding, non-binding driving connection between the axially reciprocable spindle 52 and the relatively axially immovable sleeve 57.

Referring now to the stroke limiting unit 18, an annular cap 63 telescopes over the reduced annular portion 64 of housing extension member 40 and is held in place by a centrally apertured end plate 65, which is secured to extension portion 64 as by screws 66. Held between plate 65 and extension 64 is an annular outboard bearing 67 which slidably supports quill portion 49 and is notched to receive a brass scraper ring 68 and a brass bushing 69. A grease fitting 73 is positioned in cap 63 through which grease is supplied to the annular space between cap 63 and extension portion 64 and through registering passages 74 and 75 in extension portion 64 and bearing 67 respectively to an annular groove 76 in bearing 67. The length of extension portion 64 and cap 63 are so proportioned that cap 63 will be held against relative axial movement with respect to housing extension 40 but will be sufficiently free to permit relative rotative movement around housing extension 40.

The forward stroke of quill-spindle unit 19 is determined by the position of an annular stop 77 which threadedly engages the internal surface of extension portion 64 and is provided with an axially extending slot 78. Received in slot 78 is a rod 79 which is rigidly attached as by a screw 81 to an annular collar 80 which is rotatably mounted within end member 40. An idler gear 84 is mounted for rotation on a shaft 85, both of which are received within slots in housing extension 40. Gear 84 meshes with internal gear teeth in cap 63 and with external teeth arranged around the periphery of the reduced end portion of collar 80. Rotation of cap 63 thus produces opposite rotation of collar 80, rod 79 and stop 77 effecting axial movement of stop 77 along portion 64 of extension 40 to vary the range of movement of quill 19. As shown in Figure 1, a scale 82 is provided on cap 63 for cooperation with a reference mark 83 on the stationary housing extension 40 to assure rapid and accurate selection of the desired drill stroke. A locking screw 86 (Figure 1) extends through housing extension 40 into collar 80 to lock the stroke adjusting unit 18 in its adjusted position.

The stroke adjusting unit 18 is here described only so far as is necessary for a complete understanding of the present invention and is more fully disclosed and claimed in copending application Serial No. 133,922 of Clarence Johnson filed December 19, 1949, for "Hydro-Pneumatic Power Mechanism" and owned by the assignee of this application.

Referring now to the control section 16 (Figures 3–7), 87 indicates a cast housing of shell like form, the central portion of which is open at one end and along its lower surface. The housing 87 is secured to the power section 23 by bolts 17 (Figures 1 and 2), with a carefully machined lower surface of the closed end of housing 87 in fluid tight engagement with a similarly machined upper surface of housing 23 at a point adjacent the passage 34 in the latter.

Figure 4:
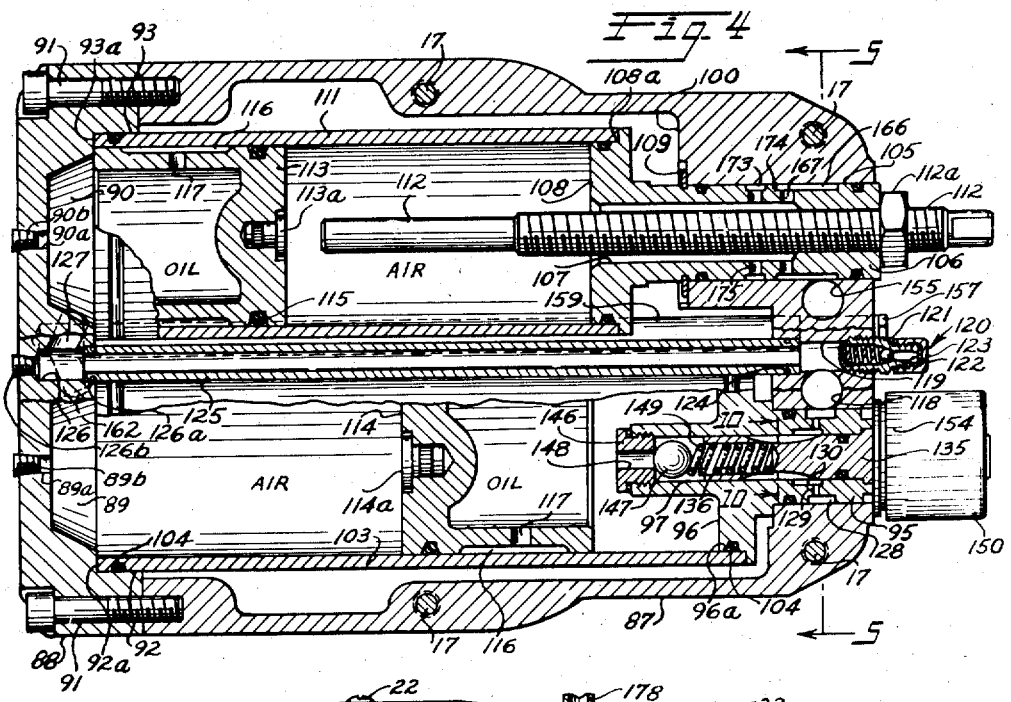
Figure 4 is an enlarged sectional view of the control section taken along line 4—4 of Figure 2, line 4—4 being shown also in Figure 5 for clarity of illustration.

A machined surface of a cast cap 88 (Figure 6), having a pair of cast frusto-conical recesses 89 and 90 is secured to the machined open end of housing 87 by means of bolts 91 (Figures 1 and 4). Machined cylindrical recesses 92 and 93 terminating in machined shoulders 92a and 93a respectively are concentrically formed around the respective recesses 89 and 90.

Threaded passages 89a and 90a extend through the cap 88 centrally of the recesses 89 and 90. The passages 89a and 90a are normally closed by threaded plugs 89b and 90b, respectively. An upwardly and rearwardly inclined passage 90c extends through cap 88 into the top of recess 90. Passage 90c is normally closed by a plug 90d. The passages 89a, 90a and 90c are provided to facilitate filling the mechanism with hydraulic fluid as more fully explained below.

A circular machined steel insert or valve body 95, having an enlarged flange portion 96 and an internal bore 97 is sealingly received within a machined bore 98 formed in the closed forward end of the housing 87. The centers of bore 98, valve body 95, and recesses 89 and 92 in cap 88 are located in axial alignment.

Valve body 95 is held in place by a nut 99 which threadedly engages a reduced extension 100 of the valve body and draws flange 96 into abutting engagement with a machined recess in the inner side of the forward wall of housing 87. Sealing rings 101 are maintained in fluid tight engagement between valve body 95 and bore 98 the outer ring 101 being held in place by a washer 102 clamped between nut 99 and the outer surface of housing 87. A machined steel cylindrical insert 103 is clamped between an annular recess 96a in flange 96 and shoulder 92a in the cap 88. Suitable sealing rings 104 maintain the cylinder 103 in sealing engagement at its opposite ends with recess 92 and the annular outer surface of the recess 96a in the flange 96.

Sealingly received within a bore 105 on the forward end of housing 87, is a machined steel insert or cylinder head 106, generally similar to valve body 95, having an internal bore 107 and an enlarged flange portion 108. A key washer 109, positioned in an annular recess in valve body 106 abuts a machined recess in a thickened portion 110 of the end wall of housing 87 to prevent axial displacement of the valve body to the right. A second machined steel cylindrical insert 111, similar to cylinder 103, is sealingly clamped between shoulder 93a in recess 93 and a machined annular recess 108a in flange 108 of body 106 in the same manner as cylinder 103. A pair of identical free pistons 113 and 114 having centrally disposed plugs 113a and 114a, respectively, are reciprocably received in cylinders 111 and 103, respectively. Each of the pistons has an O-ring seal 115 in its head portion and a reduced portion 116 intermediate its ends to reduce the area of frictional engagement between the pistons and the respective cylinder walls. A fluid passage 117 is provided in each piston to connect the inner and outer surfaces of the portion 116.

A movable abutment rod 112, extending through bore 107 into the interior of cylinder 111, is adjustably threaded into the outer reduced end of bore 107 and is held in adjusted position by a lock nut 112a for a purpose to be explained. As clearly seen in Figure 4, abutment rod 112 is aligned with plug 113a of its associated piston 113.

A drilled passage 118, in register with passages 34 and 35 extends upwardly into housing 87 and is the only fluid passage connecting the control section 16 with the power section 15. At its upper end, passage 118 is in communication with a drilled passage 119 (Figures 4 and 5) extending through the forward wall of housing 87. Passage 119 is closed at its outer end by a ball check filler valve 120 consisting of a valve body 121 threaded into the outer end of passage 119, a spring loaded ball 122 and a cap 123. Valve 120 provided a one way filler passage closed throughout normal operation of the drill mechanism, being opened only for initially filling and refilling the system with a suitable hydraulic fluid.

Passage 119 is provided at its inner end with an enlarged portion 124 in which one end of a machined tube 125 (Figure 4) is sealingly received. The opposite end of tube 125 is sealingly received within an enlarged portion 126a of a passage 126 extending through cap 88 drilled in axial alignment with passage 119. The passage 126 is normally closed by a plug 126b threaded into cap 88. The length of tube 125 is preferably selected so that it will be firmly clamped against the shoulders formed by the respective drilled portions 124 and 126a as cap 88 is drawn into abutting engagement with housing 87 by bolts 91. Communication is established between recess 90 and passage 126 through a drilled passage 127 in cap 88.

Figure 10:
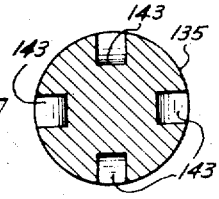
Figure 10 is a sectional view of the control valve taken along line 10—10 of Figure 4.

At a point intermediate its ends, passage 118 is in communication with an annular groove 128 in valve body 95, as best shown in Figures 4 and 5. As shown in Figure 3, an internal annular groove 129, formed in bore 97 of valve body 95 is connected to groove 128 through a plurality of circumferentially spaced radial ports 130. A valve core 135, having an internal bore 136, is positioned within bore 97 of valve body 95 by means of external threads 137 which engage internal threads 138 within extension 100 of valve body 95. A keying pin 139 within extension 100 extends into an annular groove 140 (Figures 3 and 11) in the valve core to limit axial movement of the valve core. Communication between internal groove 129 and bore 136 is established through a plurality of angularly spaced arcuate grooves 143 (Figures 3 and 10) in valve core 135. The inner end of core 135 lies adjacent a triangular metering orifice 144 (Figures 11 and 13) in the wall of a reduced portion 145 of valve body 95. A plug 146 is threaded into the inner end of reduced portion 145. A ball check valve 147 is held normally in resilient fluid tight engagement with a central bore 148 in cap 146 by a spring 149 positioned between ball 147 and one end of bore 136 in core 135.

Mounted on the outward end of valve core 135 is an adjusting knob 150. Relative movement between knob 150 and core 135 is prevented by a set screw 151 extending through knob 150 onto core 135. Rotation of [knot] *knob* 150 will, due to the threaded connection between core 135 and body 95, move core 135 axially to control the effective size of the uncovered portion of metering orifice 144 for a purpose fully explained hereafter. Due to the shape and arrangement of orifice 144 with respect to core 135 and this threaded connection extremely fine adjustments of the metering orifice can be effected.

A plurality of locking screws 152, extending through knob 150 onto extension 100 of valve body 95, is provided to prevent relative movement between knob 150 and body 95 after a predetermined adjustment of the position of core 135 has been made. The outer ends of screws 152 are preferably disposed below the surface of knob 150 to accommodate a deposit of suitable sealing compound 153 to prevent tampering and unauthorized adjustment of the valve after it has been set up for a particular job if this is desired.

A scale 154 is provided on the outer surface of the inner end of knob 150 for cooperation with a suitable reference mark 154' on housing 87 to facilitate predetermined fine and accurate adjustment of the valve assembly.

Referring now particularly to Figures 4 and 5, a drilled passage 155 extends vertically upward into housing 87 and is closed at its lower end by housing 23. At a point near its lower end, passage 155 is in communication with a passage 156, similar to passage 119, drilled through the end wall of housing 87. Passage 156 is closed at its outer end by a threaded plug 157 (Figure 2) and is provided at its inner end with an enlarged portion similar to enlargement 124 of bore 119 in which one end of a machined tube 159 is sealingly received. The opposite end of tube 159 is sealingly received within an enlarged portion 160 (Figure 6) of a passage 161 drilled into cap 88 in axial alignment with passage 156. The length of the tube 159 is preferably selected so that it will be clamped between cap 88 and the forward wall of housing 87 upon application of cap 88. Fluid communication is established between passage 161 and recess 89 by means of a drilled passage 162 in cap 88.

Figure 7:
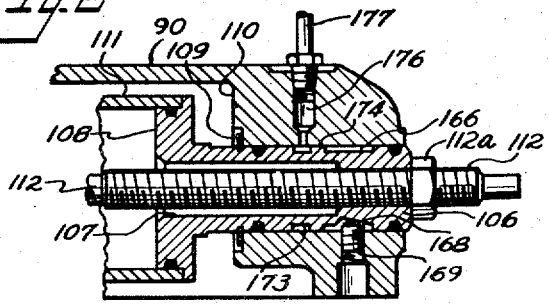
Figure 7 is an enlarged fragmentary sectional view taken along line 7—7 of Figure 2.

At a point adjacent its upper end, passage 155 opens into bore 105 at a point in register with an annular groove 166 in cylinder head body 106 which is in communication with bore 107 through a series of circumferentially spaced ports 167. As shown in Figure 7, groove 166 is provided at its lower surface with an inclined recess 168 which receives a holding screw 169. As screw 169 is tightened, the valve body will be displaced to the right bringing washer 109 into firm engagement with a recess in the forward wall of housing 87 locking cylinder head body 106 in position. A second annular groove 173, separated from groove 166 by a land 174, is in communication with bore 107 through a series of spaced ports 175 (Figure 4) and through passage 176 in housing 87 with a pipe 177 which is threaded into passage 176 (Figure 7) and leads to a source of air under pressure.

Figure 9:
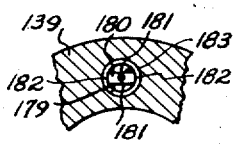
Figure 9 is a fragmentary sectional view taken along line 9—9 of Figure 8.
Figure 8:
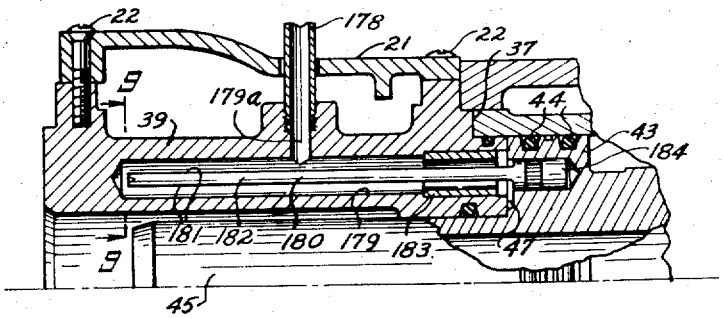
Figure 8 is an enlarged fragmentary sectional view taken along line 8—8 of Figure 2.
Figure 5:
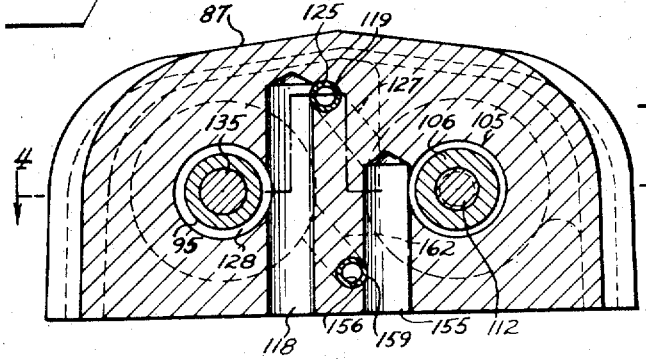

Referring now to Figures 8 and 9, the space 47 to the left of power piston 43 is in communication with a conduit 178, which passes through cover plate 21, is threaded into member 39, and leads to a source of air under pressure through drilled passages 179 and 179a in housing extension 39.

A guide rod 180, having opposed flat surfaces 181, and opposed arcuate surfaces 182 (Figure 9), which latter slidingly engage a bearing sleeve 183, pressed into an enlarged portion of bore 179, is pressed into a recess 184 in piston 43. It will be seen that while rod 180 prevents rotation of piston 43, it allows free longitudinal movement of the piston and free communication between conduit 178 and space 47 at all times.

The operation of the mechanism thus far described is as follows:

Chamber 48, of power section 15, passages 34, 118, 126, 127, 128, 129, 130, bores 97 and 136, the space to the right of piston 114, tube 125 and the space to the left of piston 113 are filled with a suitable hydraulic fluid or other liquid of low viscosity.

The filling operation is preferably performed with plug 126b and either plug 90b or 90d removed so that air entrapped in the hydraulic circuits will be bled from the highest point in the circuit. The power piston is held in its fully forward position during filling. The piston 114 is held in its corresponding fully forward position by a suitable push rod inserted through passage 89a after removal of plug 89b. The abutment member 112 is screwed inwardly to hold the piston 113 in its rearward position so as to be in proper operating position with respect to the preselected position of pistons 46 and 114. Fluid may then be introduced through conduits 215 or plug 120 forcing air out of the hydraulic circuit through passages 126, 90a and 90c. As soon as a steady flow of fluid through these passages is observed the passages are closed. As additional oil is supplied, piston 114 is permitted to move to its full left position at which point the system is completely filled. As will be seen from Figure 3 there is a substantial volume of fluid in cylinder 103 to the right of piston 114 when the power piston is fully retracted. This space, which is completely filled by the above described method constitutes an oil reservoir to assure complete retraction of the power piston even after an appreciable amount of oil has been lost from the system. If necessary the piston may be moved through one or more full strokes to eliminate entrapped air. The plug 89b is then reinserted to ready the mechanism for operation.

Conduits 177 and 178 are connected by suitable valves alternately to a source of air under pressure (not shown) or to exhaust (not shown) to thereby alternately connect chamber 47 of power section 15 and passage 173 or the space to the right of piston 113, the space to the left of piston 114, passages 155, 156, 162, tube 159, and passages 166, 167, 173, 175 and 107 to air under pressure or exhaust.

Assuming conduit 178 is connected to a pressure source conduit 177 connected to exhaust, and pistons 43, 113 and 114 to be in the position shown, air under pressure will be supplied to chamber 47 at the rear of piston 43. This air acts to move the piston to the right, advancing chuck 53 which carries a suitable drilling implement (not shown) to the right toward a workpiece. As piston 43 moves to the right fluid will be displaced from chamber 48 through passages 34, 118, 119, tube 125, and passages 126 and 127 into the space to the left of piston 113. Since the space to the right of piston 113 is vented to atmosphere through conduit 177, piston 113 will move rapidly to the right at a speed determined by the size of fixed [passage] *orifice* 34. Pistons 43 and 113 will continue to advance rapidly to the right until piston 113 abuts rod 112. The position at which piston 113 abuts rod 112 is, of course, determined by the adjusted position of rod 112 and thus can be varied within wide limits.

When piston 113 abuts rod 112, fluid can no longer leave the upper end of passage 118 through passage 119 and tube 125. However, as piston 43 is still being urged to the right under the influence of the pressurized air in space 47, the fluid to be displaced will now follow a secondary path from passage 118 through passages 128, 129, 130, 143, and bore 136 of valve body 95 (ball 147 being held on its seat) and metering then through orifice 144 into the space to the right of piston 114. Since the space to the left of piston 114 is vented to atmosphere through passage 162, tube 159, passages 155, 166, 167, 107, 173 and conduit 177, the piston 114 is free to move to the left under the influence of the fluid passing through metering orifice 144 at a rate determined by the size of orifice 144 which in turn depends upon the position of valve core 135. It will be understood that by varying the shape of orifice 144 the character of the flow adjustment effected per unit of linear movement of core 135 can be varied as desired. Since the extent of movement of piston 114 at this controlled rate depends upon the setting of rod 112 and the amount of liquid to be displaced, which is always maintained at a sufficient volume to permit the maximum permissible movement of piston 43, piston 43 will continue to advance until the forward shoulder of portion 46 abuts adjustable stop 77. It, therefore, will be seen that the advancement of piston 43 and chuck 53 through a preselected stroke determined by stop 77 is effected at two controlled speeds, and that by suitable adjustment of stop rod 112, the entire stroke as well as the portions of the stroke effected at each speed are subject to ready and precise control. In practice, the drill head is adjusted so the drill is carried to a point just short of the surface of the work at high speed and advances into the work at the controlled lower feed speed.

To return the drill to its initial position, conduit 177 is connected to a suitable source of air under pressure (not shown) and conduit 178 is connected to exhaust. Air under pressure is then supplied to the right side of piston 113, forcing the piston to the left and displacing fluid from the left end of cylinder [113] *111* through

[passages] *passage* 127, tube 125, [and passages] *passage* 118 and *fixed orifice* 34 into chamber 48. Since the chamber 47 is vented to atmosphere through passage 179 and conduit 178, piston 43 will move rapidly to the left at a speed determined by *the* size of fixed orifice 34. Air under pressure is simultaneously supplied from conduit 177 through passages 173, 175, 107, 167 and 166 of 106, passages 155, 156, tube 159 and passages 160 and 162 to the left side of piston 114 urging it to the right. *The fixed orifice 34 inherently maintains a substantial pressure differential between its upstream and downstream sides. Thus, during the retracting movement of the power piston 43, a pressure is maintained against the right side of the ball check 147 which is effective, together with the spring 149, to maintdin the ball check seated until the piston 113 seats against cap 88. Because of the back pressure created by orifice 34 the spring 149 need not be of sufficient strength to maintain the ball checked seated against the full pneumatic pressure effectively transmitted to its left side by piston 114.* [However] *Thus,* during the movement of piston 113, the pressure differential across ball check 147 is insufficient to unseat the check valve and there will be no flow through passage 148 and due to the [substantial equality of pressure on the opposite sides] *back pressure created by orifice 34 on the right side* of passage 144, there will be no appreciable flow through passage 144 and consequently, piston 114 will be held *substantially* stationary.

When piston 113 abuts against cap 88, the pressure on the right side of orifice 144 and ball 147 will immediately be substantially decreased *due to the continued bleed through fixed orifice 34.* A pressure differential will then be established across ball 147 sufficient to over come the force of spring 149. Ball 147 will then be unseated, and fluid will flow through passages 148 and 144, bores 97 and 136, passages 143, 129, 130, 128, 118, and 34 into chamber 48 forcing piston 43 to the left. This movement will continue until pistons 114 and 43 are returned to their original positions, as shown in Figures 3 and 4. *Due to the back pressure created by orifice 34 during movement of piston 113 which prevents the opening of ball check 147, piston 113 will complete its stroke and return to its initial position before piston 114 has undergone any appreciable movement. This sequential movement assures return of the control pistons to their initial positions so that successive cycles of operation will be of uniform character.* It will be noted that, although pistons 113 and 114 move sequentially, the entire withdrawal stroke of piston 43 is effected at a rapid, substantially uniform, rate.

Figure 11:
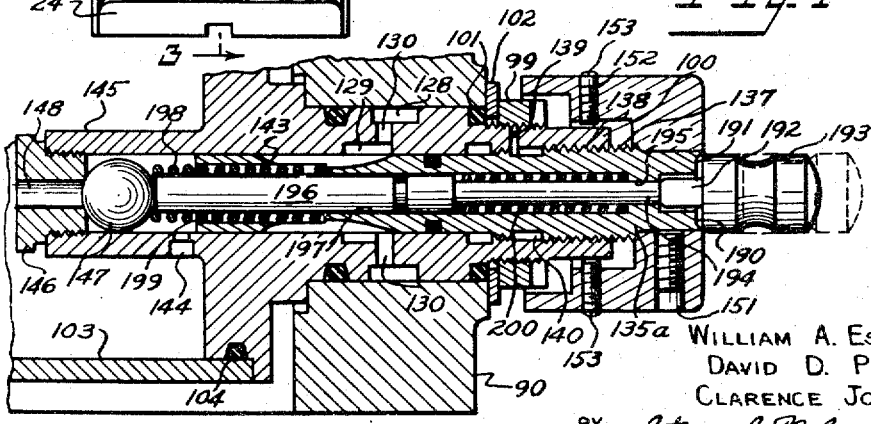
Figure 11 is an enlarged fragmentary sectional view of a modified control valve, adapted for use in place of the control valve of Figures 4 and 10.

In certain machining operations, it is desirable that the entire advancing and withdrawing stroke be effected at the relatively slow feed rate. To this end, the valve assembly 95 of Figures 3 and 4 may be modified as shown in Figure 11, wherein the valve assembly there shown is identical to the valve assembly described above except for the construction of the valve core and the components assembled therein. In its external construction, valve core 135a (Figure 11) is identical to valve core 135 (Figures 3 and 4) except that transverse slots 190 and 191 of differing depth are provided across its outer end. An extension 192 of a control knob 193 is shaped so that it may be received in either of the slots 190 and 191. Threaded into a central aperture in knob 193 is a valve actuator stem 194 reciprocably received within an internal bore 195 provided in core 135a. An enlarged portion 196 of stem 194 is reciprocably and sealingly received within an enlarged counter-bore 197 of core 135a. A spring 198, coiled about portion 196, is compressed between ball 147 and the end of a second enlarged bore 199 in valve core 135a, spring 198 and bore 109 respectively corresponding to spring 149 and bore 136 of Figures 3 and 4. A second spring 200, coiled around stem 194, is compressed between the end of bore 197 and the shoulder formed by the enlarged portion 196 of the stem.

When knob 193 is withdrawn and extension 192 is placed in slot 191, as shown in the dotted line position of Figure 11, valve stem 194 and enlargement 196 thereof is moved to the right to the dotted line position. In this position, the valve assembly functions exactly as the valve assembly described above in connection with Figures 3 and 4. However, if the knob 193 is allowed to seat in slot 190, the knob and stem occupy the full line position of Figure 11 and the enlarged end 196 of stem 194 is seated on ball 147 under the influence of spring 200 which is of sufficient strength to maintain ball 147 seated throughout the operating cycle of the drill head. Then, if abutment rod 112 is moved to the left so that it holds piston 113 against the left end of cylinder 93, it will be seen that the only path provided for oil leaving and entering the chamber 48 will be through metering orifice 144. Thus, all movement of piston 143 on both the advance and return strokes will be effected at the feed rate determined by effective size of orifice 144. If desired, the abutment rod 112 may be moved to the right to allow any desired movement of piston 113. If the knob 193 is then placed in its full line position (Figure 11), the initial portions of both the advancing stroke and the withdrawal stroke will be effected at high speed, and the final portion will be at feed speed. The relative length of the high and low speed portions of the stroke will be determined by the amount of travel of piston 113 and can be varied at will by suitable adjustment of rod 112.

As the piston 43 reciprocates, it will be apparent that the volume of the space 201 between the forward shoulder of portion 46 of the piston and the stop 77 will vary and that this variation will be accompanied by undesirable pressure resistance in this space. Particularly, as the piston is rapidly withdrawn, a vacuum will be produced in space 201 which may draw coolant and lubricant and in some cases, small metal chips which may be on the surface of quill 19, into the space with consequent damage to the accurately machined components of the drill head. To stabilize the pressure in the space 201, a vent comprising registering drilled passages 204 and 205 in head 40 and the base of housing 23, respectively, is provided. A fine screen filter 206 is connected to the outer end of the vent passage to maintain the chamber free from grit and dust, which may be present in the surrounding atmosphere.

The mechanism as a whole readily lends itself to semi-automatic or fully automatic control. By the proper employment of suitable switches and relays effective to control solenoid actuated valves in conduits 177 and 178, the mechanism can be automatically operated in response to a number of control factors. For example, a conventional pressure switch may be connected to the forward end of chamber 48 or to the liquid passage of control section 16 to signal a withdrawal of the drill when the hydraulic pressure at the forward side of piston 43 or in any part of the control section falls below a predetermined minimum due to the abutment of the quill against stop 77 or the build-up of excessive pressure at the drill point. Means responsive to the drill torque or to the motor current may alternately be provided to signal a withdrawal of the drill. In some cases, it will be desirable to combine pressure and torque responsive control means. Where drill pressures and torques may be too small to provide reliable control, an independent timer may be used to control the system. It may also be desirable to supplement the timer with a pressure switch, the latter operating only on completion of the drilling operation or under condition of severe overload.

Advance of the drill may be initiated by a switch which is actuated by the quill in its withdrawn position.

A typical automatic switch system is illustrated briefly in Figure 3, wherein numeral 210 indicates a housing, supported by any suitable means (not shown) accommodating a two-position switch, set to one position by mechanical action and to the other position by a fluid pressure responsive element. The switch, for example, may be mechanically activated by depression of a pin 211, extending through housing extension 39 at a point opposite the end of end portion 45 of quill 19 in its fully withdrawn position. When the switch is so activated, leads 212 and 213 are energized to activate suitable solenoid-operated valves (not shown) to connect conduits 178 and 177 to pressure and exhaust, respectively, initiating an advance stroke of quill unit 19. When forward movement of the quill is arrested by stop 77 or by excessive pressure at the drill point, the pressure in space 48 will rapidly decrease. This pressure decrease is transmitted through passage 31 in sleeve 28, a drilled passage 214 in housing 23, and a fluid conduit 215, to the pressure responsive switch element in housing 210. Leads 216 and 217 are then energized, reversing the position of the valve in conduits 177 and 178, effecting a withdrawal of the quill unit. The cycle may be repeated indefinitely or may be interrupted at any point by operating suitable manual switches (not shown) which break the circuit in either leads 212, 213 or 216, 217 preventing energization of the said solenoid operating valves.

Other suitable automatic control systems are developed in the copending application of Clarence Johnson, Serial No. 133,922, referred to above, and application Serial No. 137,605, of Clarence Johnson for Switch Mechanism and Control Circuit for Hydro-pneumatic Power Mechanism, filed January 9, 1950, both owned by the assignee of the present application.

The modified mechanism illustrated in Figures 14 to 19 is, in its major aspects and in function, substantially the same as that above described in connection with Figures 1 to 13, and accordingly, insofar as possible the same reference numerals are used to indicate similar parts in this modification.

A number of detailed refinements have been incorporated in the modified mechanism to further reduce manufacturing and assembling costs, to assure the elimination of air pockets in the hydraulic circuit, and to facilitate bleeding and filling these circuits. Because of the close similarity between the two forms of the invention, the mechanism illustrated in Figures 14 to 19 will be described only insofar as is necessary to explain the points of distinction between the two modifications.

Referring now to Figure 14, 250 indicates generally the power section of the modified feed mechanism to which a control section indicated generally at 252 is rigidly attached as by studs 253 and nuts 255 (Figure 18). A stroke adjusting unit indicated generally at 254 through which one end of the combined power piston and drill quill spindle unit 256 passes is mounted on the front end of the power section 250. Suitable cover plates for the mechanism, not shown, may be provided as required to protect the mechanism from objectionable foreign matter.

The power section 250 includes a main body housing 258 of hollow shell-like cylindrical construction provided with suitable external mounting and aligning pads previously described. Cylindrical inserts or sleeves 260 and 261 are received within the body section 258, the former being provided with a sealing ring 262 at one end. Sleeve 261 is adapted to receive an outer sealing ring 263 and an inner sealing ring 265. A washer 265a is desirably formed of soft metal such as Babbitt metal, so any particles entering through sleeve 261 will be ground into the washer to prevent scoring the quill. [washer] *Washer* 265a retains the ring 265 in proper position in sleeve 261. The outer surface of sleeve 261 is provided with an annular groove 266 into which a plurality of angularly spaced drilled passages 267 extend to establish fluid communication between the interior of sleeve 260 and the outer periphery of the sleeve 261. To facilitate installation of the sleeve 261 without damage to the machined inner surface of the body section 258, a slight clearance is provided at the peripheral flange portion of sleeve 261 extending inwardly of the groove 266. It will be noted that sleeve 261 is of substantial length to provide an adequate bearing support for the power piston 268.

Housing extensions or cylinder heads 270 and 271, respectively, close the rear and front ends of the body section 258 to which they are rigidly secured as by bolts not shown in a manner previously described. The power piston 268 is of generally the same construction as the piston 46 previously described except that a machined sleeve 269 is press fitted onto the reduced forward portion of piston 268 and reciprocates with close fit within sleeve 261. Also a plurality of circumferentially spaced passages 272 are provided to establish communication between the interior of the piston and the enclosed chamber 274 within the stroke adjusting unit 254.

The interior of the piston 268 is also connected to the expansible chamber within the axially fixed drive sleeve 276 through spaced passages 277. Thus the spaces 274 and 275, the volumes of which vary inversely in substantially equal amounts during movement of the power piston, are vented to each other and changes in the internal volume of the power section are thus internally compensated for.

A vent port 278, into which a dust filter 279 is threaded, is provided to vent the power section to accommodate any slight inequalities which may exist in the variations in volume of the spaces 274 and 275.

A spindle 281 is rotatably supported within the piston 268 by means of a sealed pre-loaded bearing cartridge indicated generally at 282. An annular outer pre-loading member 283 is threaded into the forward end of the piston 268, the inner pre-loading member 284 being threaded onto the forward end of the spindle. The forward end of the spindle is enclosed by a dust cap 285 also threaded onto the end of the spindle, the cap 285 providing a labyrinth seal at the forward end of the bearing.

The simplified stroke adjusting mechanism 254 includes a cap 286 which telescopes over the reduced forward section of the closure member 271 and is fixed against axial movement by a plurality of cap screws 288 threaded into cap 286, and having sharp extensions which extend inwardly of cap 286 into a peripheral annular groove in the member 271. An annular cover plate and sealing ring structure 290 is secured in an annular recess formed in the forward end of the cap 286 as by screws 291. Press fitted into a drilled bore in the cap 286 is rod 294 which extends axially through a notch in an annular stop nut 296 threaded into the bore of closure member 271. It will be seen that when cap 286 is rotated, nut 296 will be threaded axially into or out of space 274 and will thus provide an adjustable stroke limiting abutment for the forward shoulder 297 of the power piston. In this connection, it will be understood that rod 294 is disposed radially outward a distance sufficient to clear sleeve 269 of piston 268.

A means for locking the cap 286 in its adjusted position is illustrated in Figure 17 which is a sectional view in a plane approximately 30° from the vertical behind Figure 14. The upper surface of member 271 which is flat and appears nearly flush with the cap 286 in Figure 14, is offset with respect to the cap in the plane of Figure 17 so that a shoulder is formed therebetween. A locking stud 302 is threaded into the corner of this shoulder at an angle of approximately 45°. A lock washer 304 on stud 302 is provided with a beveled surface which engages the cap 286 and the vertical shoulder of member 271 and thus locks the cap in adjusted position. A conduit 298 threaded into a passage 299 which leads to the forward side of the piston 268 is provided to supply a volume of pressure fluid for the automatic actuation of a suitable control section which may take any of the forms previously described.

Except for the above noted features, the power section 250 is substantially the same as the power section 15. The single passage 310 leading to annular groove 266 also communicates with the novel control section 252 now to be described.

The shell-like control section 252 is comprised of three members, a main body section 320, a cap 322 and cover plate 324. The body section 320 comprises a relatively thick forward wall 325 which joins at its lower edge an integral right angularly extending section 326. The member 320 is machine finished along a portion of the outer surface of section 326 so as to tightly engage the upper machined surface of the power section housing 258 to which it is secured by the studs 253 and nuts 255.

The forward wall 325 is provided with parallel spaced bores 328 and 329 and intercommunicating vertical bores (not shown) substantially as described in connection with the housing member 87.

An annular machine steel insert or valve body 330, which, except for slight changes in proportioning, is identical to the valve body 95, is received in the bore 328 and secured in place by a nut 332 as previously described. A liner 353 is provided in the inner end of the central bore in the valve body 330 to guide the ball check valve 147' into and out of seating engagement with plug 146'. The adjustable valve core 334 differs from the previously described core 135 only in that the spring receiving bore 336 is provided with an axial extension 337 which is in fluid communication with the hydraulic circuit of the mechanism through a plurality of spaced passages 338.

Figure 16:
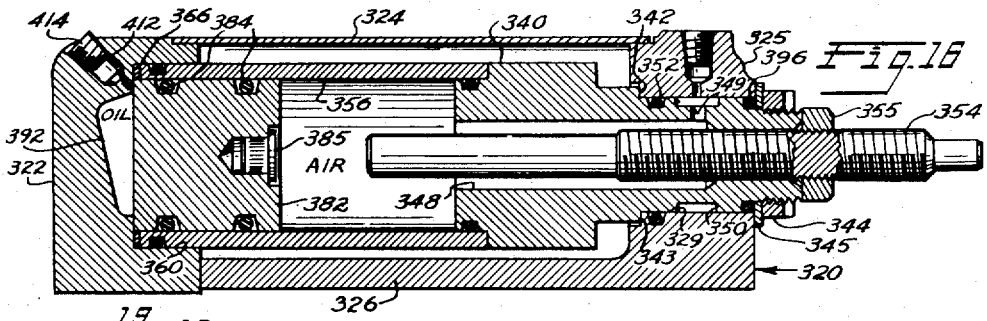
Figure 16 is a vertical sectional view taken along line 16—16 of Figure 15 of one of the control cylinders.

A machine steel insert or cylinder head 340, Figure 16, is fitted into bore 329 with a machined shoulder 342 held in tight engagement with a machined recess 343 in the wall 325 by a nut 344 threaded on to the portion of the cylinder head extending externally of the wall 325. A washer 345 is clamped between the nut 344 and the wall 325 to hold a sealing ring 396 in place in bore 329. The interior bore of the cylinder head 340 communicates with the air circuit of the mechanism through circumferentially spaced passage 349 and an annular groove 350 in register with air circuit passages of the wall 325. A sealing ring 352 is provided to prevent leakage toward the inner surface of the wall 325. The movable abutment member 354 is threaded into the head 340 and adjustably locked in place by a nut 355.

One end of a machine steel cylinder 356 is telescoped over a reduced end portion of cylinder head 340 against an annular machined shoulder. The opposite end of the cylinder 356 is received within a machine bore 360 in the cap 322. The opposite ends of a similar cylinder 362 are likewise respectively telescoped over an annular machined shoulder on the valve body 330 and received within a machined bore 364 in cap 322. Spring washers 366 are positioned between the ends of the cylinders 356 and 362 and the bottom of the respective recesses in the cap 322 in which they are received. The washers are provided to positively position the cylinders despite small variations in distances between the seating surfaces on which the cylinders are supported.

The cap 322 is secured at spaced points along its lower surface to the horizontal section of the body 320 by bolts 368 (as shown in Figure 15), machined surfaces being provided along the mating lines of the cap 322 and the body 320.

At a point slightly off-set from the mid-point of its upper surface, the cap is secured by a bolt 370 to a spacer rod 372 (Figure 15) the opposite end of which is threaded into the wall 325 of the body 320. The effective length of the rod 372 is fixed by a lock nut 374. The respective lengths of the rod 372 and the cylinders 356 and 362 are selected so that when the cap is properly installed a slight clearance is preferably provided at the washers 366 whereby the cylinders are yieldingly urged toward their respective opposite end mounting surfaces.

Clamped in a similar manner between the cap 322 and the wall 325 are machined steel tubes 376 and 378 which communicate respectively with the hydraulic and air circuits of the mechanism in the same manner as tubes 125 and 159 described above.

The cover plate 324 extends over the top and sides of the control section between the cap 322 and the wall 325 and is secured at its bottom edge to the body section 320 by plurality of screws 379. The opposite ends of the cover 324 are received in peripheral recesses in cap 322 and wall 325 so as to be flush therewith.

Reciprocably received within the cylinder 356 is a solid free piston 382 which is provided with a sealing O-ring 384. A plug 385 is pressed into the center of the forward face of the piston 382 in alignment with the abutment member 354. A free piston 386, having sealing rings 387 is reciprocably received in cylinder 362 and is provided with a central recess 388 of slightly greater diameter than the rearward extension of the body 330. The depth of the recess 388 is such that in the full forward position of the piston (which is never reached in the normal operation of the mechanism the normal forward position of the piston 386 being illustrated in Figure 14), plug 146' abuts the bottom of the recess and the port 144' is left partially uncovered.

As best illustrated in Figures 16 and 19, the machined recesses 360 and 364 in cap 322 which receive the ends of the cylinders 356 and 362 are provided with reduced extensions 392 and 394, respectively, with each having a rearwardly and inwardly sloping wall so that the region of greatest depth is disposed upwardly and inwardly of the axis of the respective cylinders. As shown in Figure 14, a bore 396 extends through cap 322 into the recess 394 in alignment with the axis of cylinder 362. This bore, which is normally closed by a threaded plug 398, serves as a passage through which a push rod may be inserted to position the piston 386 against plug 146' during the filling operation as is explained more fully below. The end of hydraulic tube 376 is in communication with recess 392 through an inclined bore 404 which extends to the outer surface of cap 322 and is closed by a threaded plug 406. A similar inclined passage 408 connects the air tube 378 and recess 394 and is closed by a threaded plug 410.

A rearwardly inclined passage 412 (Figure 16) connects the upper portion of the recess 392 with the exterior of the cap and is closed by a threaded plug 414. The function of the several passages in the cap 322 will be readily understood from a description of the method of filling the mechanism with hydraulic fluid presently to be described.

It will be noted that the filler plug 120 has been omitted in the modified apparatus, the hydraulic fluid being supplied through passage 299 in the power section housing. In filling the mechanism, two factors are of particular importance. First, the control pistons 382 and 386 must occupy their proper relative positions with respect to the power piston 268. Second, since the precise operation and control which characterizes the mechanism is dependent in large measure on the action of the incompressible hydraulic fluid particular care must be taken to prevent the entrapment of air in the hydraulic circuit. The modified mechanism of Figures 14 to 19 is constructed to enable the ordinary mechanic to control both of these factors with ease.

To begin the filling operation, the power piston is moved to its fully forward position and plugs 398, 406 and 414 are removed.

A push rod is then inserted through bore 396 to place the piston 386 in its fully forward position. Abutment rod 354 is screwed into cylinder 356 to hold the piston 382 in its fully retracted position. Hydraulic fluid at moderate pressure is supplied through passage 299 to the space at the forward side of the power piston and flows upwardly through groove 266 thence through passage 310 into the control section where it flows through passages previously described to the forward side of piston 386. Because of the small clearance provided at the forward side of this piston a very small amount of air will be entrapped there. The oil also flows along tube 376 and through the passage 404 into space 392. Since the bore 404 is at the highest position in the system, all the air is bled ahead of the inflowing hydraulic fluid except the small amount entrapped at the forward side of piston 386. To remove this air the power piston 268 and control piston 386 may be reciprocated through a number of cycles manually. To provide the necessary fluid reservoir at the forward side of piston 386 as illustrated in Figure 14, plugs 406 and 414 are installed and additional oil is added while piston 386 is permitted to move to its full left position. Then by installing the plugs 398 in cap 322 and disconnecting the fluid supply lines the apparatus is ready for operation. It is [at the highest position in the system whether the mechanism is] to be noted that either the passage 406 or 412 *is at the highest position in the system whether the mechanism is* installed in a horizontal or a vertical position. Thus the method of filling described will be equally effective in either position.

The operation of the device of Figures 14 to 19 is identical with the exception of the back feed to that previously described in connection with Figures 1 to 13. Consequently, only the back feed operation will be described here.

It will be recalled that retraction of the power piston at the slow feed rate to provide back feed as desired was accomplished in the apparatus of Figures 1–13 by the selective positioning of rod [19] *196* (Figure 11).

The modified mechanism of Figures 14 to 19 may be adapted for back feeding either by the incorporation of a similar mechanism or by the substitution of a solid plug (not shown) for the apertured plug 146' and the removal of the associated ball check valve. During the feed portion of stroke in either direction the hydraulic fluid thus flows only through the feed port 144.

It is to be understood that because of the basic similarity of the two forms of the invention, any of the modifications described in connection with Figures 14 to 19 may be readily incorporated in the mechanism of Figures 1 to 13.

It will be apparent from the foregoing that the compact drill mechanism is ideally suited for manufacture with low cost, high speed factory mass production assembly techniques.

Both the hollow cast housings for the power section and the control section require a minimum of machining to put them in finished form. Such machining as is required may be performed in simple operations. For example, machining of the interior of the hollow cast power section housing merely requires a single straight through boring operation since all of the interior finished surfaces are of the same diameter and consist merely of aligned annular seating surfaces. The passages and apertures in the forward wall of the control section are also respectively of uniform diameter and readily accessible for ordinary through boring operations to simplify the finishing operation. The mating surfaces on the two housings are of minimum area and are all readily accessible external surfaces whereas the cylinder and tube abutment surfaces of the control housing are accessible also by ordinary through or counterboring tools. None of these drilled passages, bores or the like is of inordinate length requiring special attention or complicated chucking of the housing to perform the drilling operations.

Further economies are affected by providing separable working parts of high grade steel thereby minimizing costs while assuring long life. Easy removal and replacement of these parts, such as the cylinders, pistons, and other parts subject to the most rapid wear is also obtained. The cylinders and pistons of the apparatus of Figures 1–13 are of identical construction so they may be made on one machine set up which substantially reduces the cost of manufacture and obviates the necessity for maintaining inventories of a number of dissimilar parts and the possibility of misassembly incident to use of dissimilar parts.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

1. In a hydro-pneumatic mechanism having a power section containing a power piston and a control section containing a plurality of control pistons: separate shell-like housings for each of said sections having fluid passages at their opposite ends; an external machined mounting surface on one of said housings; a mating external machined mounting surface on the other of said housings; means for connecting said housings in assembled relation and maintaining the said surfaces in engagement with certain of said passages in register; open ended, cylindrical inserts for each of said housings adapted to respectively reciprocably receive said pistons and each having one end in fluid communication with said registering fluid passages to form a closed fluid reservoir and having their opposite ends in communication, through others of said fluid passages with a source of pneumatic pressure adapted to be selectively applied to said power piston or said control pistons to effect desired operation of said mechanism.

2. In a hydro-pneumatic mechanism: a power section, comprising a first cast shell-like housing for said power section having a machined cylindrical bore, a machined power cylinder mounted in said bore, machined cylinder heads positioned at opposite ends of said bore in fluid tight engagement with said power cylinder, and a power piston in said cylinder; a control section for regulating the movement of said power piston, comprising a second cast shell-like housing for said control section having an open end and a wall at its other end, a plurality of machined control cylinders mounted in said second housing, respective control pistons in said respective control cylinders, respective machined inserts mounted in and extending through said wall for supporting one end of said respective control cylinders, a cap closing the said open end of said second housing, and a plurality of machined clamping surfaces in said cap for clamping said control cylinders against said inserts; securing means comprising machined mating surfaces on each of said housings for securing said housings in assembled relation; and fluid passages in each of said housings interconnecting said power piston and said control pistons for tandem movement by said fluid in said fluid passages.

3. In a hydro-pneumatic mechanism having a power piston: a control section for regulating the movement of said power piston comprising, a shell-like housing having fluid passages at one end, one of said passages communicating with said power piston; a plurality of open ended cylinders positioned within said housing; a control piston reciprocably received in each of said cylinders; inserts in said one end of said housing having machined surfaces for sealingly engaging and supporting one end of each of said respective cylinders; a cap for said housing having machined surfaces for sealingly engaging and supporting the opposite end of each of said respective cylinders; and fluid passages in said cap and said inserts through which respective opposite ends of said cylinders are placed in communication with said one fluid passage to form a closed fluid chamber and the respective other ends of said cylinders are placed in communication with a source of pneumatic pressure adapted to be selectively applied to said control pistons to effect desired operation of said mechanism.

4. In a hydro-pneumatic mechanism having a power piston: a unitary control section having a plurality of control pistons and a fluid circuit connecting said control pistons to a source of pneumatic pressure or exhaust and to a source of liquid confined between said power piston and control pistons for securing tandem movement of said pistons comprising, a cast shell-like housing open at one end and along at least one side face and having a wall at its opposite end provided with independent first fluid circuit passages having ends opening inwardly toward said open end of said housing, one of said passages forming part of a chamber for said confined liquid and communicating with said power piston; machined inserts extending through said wall and having respective machined seating surfaces facing toward said open end of said housing and having respective passages therein connecting said respective seating surfaces to one of said first passages; a plurality of open ended machined cylindrical inserts positioned within said housing with their respective adjacent ends sealingly supported on respective ones of said seating surfaces and communicating with the respective passage therein; respective control pistons reciprocably disposed in said cylindrical inserts; a cast metal end closure cap rigidly attached to the open end of said housing and having respective machined seating surfaces for sealingly supporting the respective opposite ends of said cylindrical inserts and respective passages opening toward said wall and respectively communicating with said opposite ends of said cylindrical inserts; and machined tubes extending between said wall and said cap and respectively connecting one passage in said cap to said inwardly opening end of the other passage in said wall and said one of said passages in said cap to the inwardly opening end of said other passage in said wall to interconnect respective sides of said control pistons and complete said fluid circuit.

5. The structure of claim 4 together with a valve positioned in one of said inserts for controlling the flow of fluid through said one passage in said wall.

6. The structure of claim 5 together with a movable abutment extending through the other of said inserts into its respective cylinder for limiting the stroke of said control piston therein.

7. In a power feed mechanism having a power piston movable through an advance and return stroke at a speed determined by the rate of flow of fluid into and out of a fluid chamber at one side of said piston: a valve unit for controlling the said rate of flow, comprising a body having a first passage of a given size and open at all times and a second passage in parallel with said first passage; and means to open said second passage only when said fluid is flowing into said chamber whereby said power piston will move through an advance stroke at one speed and through a return stroke at a different speed.

8. In a hydro-pneumatic mechanism having a power section containing a fluid controlled power piston: a unitary control section in fluid communication with said power section for regulating the movement of said power piston, comprising a cast shell-like housing open at one end and having a wall at its opposite end; a plurality of open ended machined cylinders in said housing in side by side relation; a free piston in each of said cylinders; respective inserts extending through said wall having machined surfaces for sealingly engaging and supporting one end of said cylinders; a cap attached to said open end of said housing and having respective machined surfaces for sealingly engaging and supporting the opposite ends of said cylinders; a plurality of tubes clamped between said wall and cap in parallel relation to said cylinders; and respective fluid passages in said cap for connecting one end of each of said tubes to a respective cylinder; and respective fluid passages in said wall for connecting the other end of one of said tubes and one end of the other respective adjacent cylinder end to said power section and for connecting the other end of the other of said tubes and its respective adjacent cylinder end to a source of pneumatic pressure adapted to be selectively applied to said power piston or said control pistons to effect desired operation of said mechanism.

9. In a hydro-pneumatic mechanism having a power section containing a power piston and a control section containing a plurality of control pistons: separate cast shell-like housings for each of said sections; an external machined mounting surface on one of said housings; a mating external machined mounting surface on the other of said housings; means for connecting said housings in assembled relation; open ended machined cylinders in each of said housings; a freely reciprocable piston in each of said cylinders; respective members removably mounted at opposite ends of each of said housings, each of said members having a machined surface for sealingly engaging and supporting the adjacent end of said respective cylinders; and fluid passages in said housings and said members adapted to connect one side of each of said pistons to a closed fluid circuit and the opposite side of each of said pistons to a source of pneumatic pressure adapted to be selectively applied to said power piston or said control pistons to effect desired operation of said mechanism.

10. In a hydro-pneumatic mechanim: a power section for moving a machine tool relative to a work piece: comprising a cast shell-like housing; axially spaced machined surfaces internally of said housing; a machined cylinder frictionally mounted on said machined surfaces; cast members mounted at the opposite ends of said housing having machined surfaces in abutting relation with opposite ends of said cylinder and forming therewith a fluid chamber; a piston reciprocably received within said chamber, said piston being adapted to carry a machine tool; and fluid passages in each of said members through which the opposite sides of said piston are connected to a power fluid circuit and a control fluid circuit.

11. In a hydro-pneumatic mechanism: a power section for moving a machine tool relative to a work piece, comprising an open ended cast shell-like housing; spaced inwardly extending machined surfaces adjacent opposite ends of said housing; a machined cylinder having spaced machined surfaces positioned on said machined surfaces in said housing; cast members at opposite ends of said housing in abutting relation with the oppoite ends of said cylinder and having machined surfaces engaging said machined surfaces in said housing; a power piston reciprocably received within said cylinder; means for rotatably mounting a tool carrying device within said piston; a fluid passage in one of said members for connecting one side of said piston to a closed fluid control circuit; a fluid passage in the other of said members for connecting the other side of said piston to a power fluid circuit; and means associated with said piston and said last mentioned member for preventing rotation of said piston while permitting free reciprocation thereof.

12. A hydro-pneumatic mechanism according to claim 11 wherein said last mentioned means comprises an elongated rod rigidly attached to said piston and reciprocably received within said fluid passage in said last mentioned member.

13. A unitary fabricated control section for a hydro-pneumatic mechanism comprising a recessed cast body having an end wall and open at the other end and along one side, the peripheral marginal side and end edges of said one side and said open end being machined for respective mating engagement with a mounting surface of a machine tool and an end closure cap and said closed end having a pair of axially extending, laterally offset mounting bores therethrough spot faced around their inner ends and fluid passages respectively connecting said bores to the interior of said body and at least one of said bores to the marginal end edge formed by said wall and the other of said bores to the exterior of said body; a mounting insert disposed in each of said bores and each having a central, axially extending bore and passage structure for placing the inner ends of said inserts in communication with its respective mounting bore; an annular, axially extending machined support surface of enlarged diameter formed at the inner end of each of said inserts and intersecting a radially directed abutment shoulder disposed in axially spaced relation from said inner end; a cast end closure cap mounted on the open end of said body having cored recesses disposed in respective coaxial alignment with said mounting bores and each having a counterbored annular, machined mounting recess in coaxial relation to the respective mounting surfaces of said inserts and fluid passages respectively connecting said recesses to the interior of said body in inverse coaxial alignment with said fluid passages in said wall; respective machine steel cylindrical inserts extending between said mounting surfaces of said inserts and its opposed mounting recess and sealingly engaged therewith; a freely reciprocable piston mounted in each of said cylindrical inserts; and machine steel tubes extending between and sealingly communicating with said coaxially aligned passages in said wall and said cap whereby the opposite ends of said cylindrical inserts are cross connected to assure connection of the oppoite ends of said cylindrical inserts to said one bore and to the exterior of said bore.

14. The combination defined in claim 16 wherein the insert in said one bore contains an adjustable bleed passage continuously open to the end of the cylinder mounted thereon and said other insert carries an adjustable abutment element adapted to predetermine the length of movement of the piston in its associated cylinder.

15. The combination defined in claim 14, wherein the first mentioned insert also contains a second passage containing a one way valve adapted to permit fluid flow from said end of said cylinder to said one bore.

16. A quill and spindle assembly for a hydro-pneumatic drill feed mechanism comprising a combined power piston and quill composed of an integral tubular body having an enlarged annular piston portion, oppositely extending reduced diameter tubular end portions and an anti-rotation rod; axially spaced, internal bearing seats formed in one of said tubular end portions, the inner seat at its innermost end terminating in an inwardly directed abutment shoulder; inner and outer bearing elements respectively disposed on said seats and including inner and outer races; an outer sleeve extending between said outer races, an inner sleeve extending between said inner races; a spindle carried by said inner races and having a body portion within said sleeve; a tool chuck of greater diameter protruding axially from one end of said body portion and beyond said outer bearing element and forming an abutment shoulder at its juncture with said spindle body portion and a splined section of reduced cross section protruding axially from the other end of said spindle body portion and beyond said inner bearing element and into said tubular body; a bearing retainer nut threaded on said spindle between said splined section and said inner bearing element and adapted when tightened to clamp said inner bearing races and said inner sleeve between said nut and said abutment shoulder of said spindle; and a retainer nut threaded in the end of said one of said tubular end portions and adapted when tightened to clamp said outer bearing races and said outer sleeve between said last mentioned retainer nut and said inwardly directed abutment shoulder.

17. In a hydro-pneumatic mechanism having a power cylinder, at least one control cylinder, and a fluid circuit connecting said cylinders: a valve for controlling the flow of fluid in said circuit comprising, a body having a longitudinally extending central bore and longitudinally spaced ports extending through said body into said central bore; a core in said central bore having one end extending out of said bore and an opposite end normally adjacent one of said spaced [parts] *ports,* a central recess opening through said one end, and ports connecting the other of said spaced ports in said body with said central recess; and means to move said core longitudinally in said body whereby said one end of said core adjustably covers a portion of said one of said spaced ports to control the flow of fluid therethrough.

18. The combination defined in claim 17 together with an end closure element for said bore having a fluid passage; a ball valve adapted to seat on one end of said fluid passage; and resilient means positioned within said recess in said core and engaging said ball to urge said ball against said one end of said fluid passage to normally close said fluid passage.

19. The combination defined in claim 18 together with a longitudinal bore in said core, an axially movable rod extending through said bore in said core, resilient means in said bore for urging said rod against said ball to maintain said ball in its seated position, and separate means for selectively rendering said resilient means ineffective to thereby maintain said rod out of seating contact with said ball.

20. The combination defined in claim 17 wherein said valve body includes a flange intermediate said spaced ports and an annular shoulder on said flange for sealingly engaging and supporting one end of said control cylinder between said spaced ports.

21. In a hydro-pneumatic mechanism having a power cylinder, at least one control cylinder, a power piston and a control piston mounted in the respective cylinders and arranged to move in tandem; means for controlling the stroke of said control piston comprising, a cylinder head for said control cylinder; a shouldered flange on said head for sealingly supporting one end of said control cylinder; a reduced section in said head extending away from said cylinder and having a recess opening into said cylinder, said extension also having at least one fluid passage for connecting said recess selectively to a source of pressure or exhaust; and an abutment rod adjustably extending through said recess into said cylinder for limiting the stroke of said control piston.

22. In a hydro-pneumatic mechanism having an open ended control section containing a plurality of open ended tubular members; a closure cap comprising, a body having a machined marginal surface for engaging said control section at the open end thereof and laterally spaced recesses for sealingly supporting certain of said members; recessed machined surfaces for sealingly supporting others of said members, said recessed machine surfaces being formed around the ends of passages in said cap leading to said spaced recesses.

23. A quill and spindle assembly for a hydro-pneumatic drill feed mechanism comprising a combined power piston and quill composed of an integral tubular body having an enlarged annular piston portion, oppositely extending reduced diameter tubular end portions and an anti-rotation rod; axially spaced, internal bearing seats formed in one of said tubular end portions, the inner seat at its innermost end terminating in an inwardly directed abutment shoulder; inner and outer bearing elements respectively disposed on said seats and including inner and outer races; an outer sleeve extending between said outer races; an inner sleeve extending between said inner races; a spindle carried by said inner races and having means providing an abutment, and retaining means on said one of said tubular end portions and said spindle adapted, respectively, when tightened to clamp said outer and inner bearing races and sleeves against the respective abutments on said one of said tubular end portions and said spindle.

*24. A power feed mechanism comprising a power cylinder and piston adapted for connection to a machine tool to effect relative movement of the tool and workpiece; a hydraulic control system for controlling movement of said power piston in both directions and comprising a plurality of control cylinders and pistons; a control valve operable to alternately connect said power cylinder and said control cylinders to a source of pressure and exhaust to alternately effect movement of said power piston and said control pistons through an advance and retract stroke; a closed liquid circuit having a main passage and a plurality of branch passages leading therefrom to said control cylinders through which liquid is constrained to flow during movement of said power piston, a one-way valve in one of said branch passages adapted to prevent appreciable flow therethrough during the portion of the advance movement of said power piston when flow takes place through said other branches; and means for effectively restricting flow in said main passage to establish a back pressure effective to maintain said one-way valve closed during retracting movement of the control pistons associated with the other of said passages whereby one control piston is held against retracting movement until said other control pistons are fully retracted.*

*25. A power feed mechanism having a power piston movable in a power cylinder through an advance and retract stroke; a pair of control pistons movable in respective control cylinders; a closed hydraulic circuit connecting one side of said power piston and one side of each of said control pistons, said circuit having first and second branches leading to one of said control pistons and a third branch leading to the other of said control pistons; means for selectively connecting the other sides of said power piston and said control pistons to pressure and exhaust to advance and retract said power piston and said control pistons; means restricting flow in said first of said branches below the flow through said third branch; a check valve in the second of said branches for preventing flow therein from said power piston toward said one of said control pistons; and means in said hydraulic control circuit for maintaining said check valve closed during retracting movement of said other of said pistons and thereafter permitting said check valve to open to permit retraction of said one control piston whereby said control pistons retract sequentially.*

*26. A power feed mechanism comprising a power piston movable in a power cylinder, a plurality of control pistons movable in respective control cylinders, means for alternately connecting one end of said power cylinder and one end of each of said control cylinders selectively to pressure and exhaust to move said power pistons and said control pistons in advance and retract directions, a closed liquid circuit having parallel fluid branches connecting the opposite end of said power cylinder to the opposite end of each of said control cylinders whereby the rate of movement of said power piston is controlled by the rate of movement of said control pistons, means for controlling the movement of at least one of said control pistons during the advance movement of said power piston to thereby control the rate of advance movement of said power piston, and flow restricting means in said liquid circuit for effecting sequential retraction of said control pistons.*

*27. A power feed mechanism having a power piston movable through an advance and retract stroke; a pair of control pistons; a closed hydraulic circuit connecting one side of said power piston and one side of each of said control pistons, said circuit having first and second branches leading to one of said control pistons and a third*

*branch leading to the other of said control pistons; means for selectively connecting the other side of said power piston and the other side of each of said control pistons to pressure and exhaust to advance and retract said power piston and said control pistons; a check valve in one of said branches for preventing flow therein from said power piston to said one of said control pistons; and flow restricting means in said hydraulic circuit for maintaining a back pressure on said check valve to maintain said check valve closed during retracting movement of said other of said power pistons to effect sequential retraction of said control pistons.*

*28. A power feed mechanism comprising a power member movable in a power chamber, a plurality of control members movable in respective control chambers, means for alternately connecting one end of said power chamber and one end of each of said control chambers selectively to pressure and exhaust to move said power members and said control members in advance and retract directions, a closed liquid circuit having parallel fluid branches connecting the opposite end of said power chamber to the opposite end of each of said control chambers whereby the rate of movement of said power member is controlled by the rate of movement of said control members, means for controlling the movement of at least one of said control members during the advance movement of said power member to thereby control the rate of advance movement of said power member, and flow restricting means in said liquid circuit for effecting sequential retraction of said control members.*

References Cited in the file of this patent or the original patent

UNITED STATES PATENTS

| Number | Name | Date |
|---|---|---|
| 706,688 | Reynders et al. | Aug. 12, 1902 |
| 1,069,995 | Anderson | Aug. 13, 1913 |
| 1,434,564 | Ruetschi | Nov. 7, 1922 |
| 1,948,115 | Johnson | Feb. 20, 1934 |
| 2,114,389 | Kingsbury | Apr. 19, 1938 |